United States Patent [19]

Ohshima et al.

[11] Patent Number: 5,024,907

[45] Date of Patent: Jun. 18, 1991

[54] SOLID ELECTROLYTE TUBE FOR SODIUM SULFUR CELLS AND SURFACE FINISHING PROCESS THEREOF

[75] Inventors: Masaaki Ohshima; Akira Kobayashi, both of Chofu; Senji Atsumi, Kakamigahara; Hiromi Shimada, Nagoya, all of Japan

[73] Assignees: The Tokyo Electric Co., Tokyo; NGK Insulators, Ltd., Aichi, both of Japan

[21] Appl. No.: 452,430

[22] Filed: Dec. 19, 1989

[30] Foreign Application Priority Data

Dec. 19, 1988 [JP] Japan .................. 63-321336

[51] Int. Cl.$^5$ .............................................. H01M 10/38
[52] U.S. Cl. ................................ 429/191; 29/623.1; 264/340; 429/193
[58] Field of Search ....................... 429/193, 191, 104; 264/340; 29/623.1

[56] References Cited

U.S. PATENT DOCUMENTS

| | | | |
|---|---|---|---|
| 4,113,928 | 9/1978 | Virkar et al. | 429/193 |
| 4,374,701 | 2/1983 | Singh | 429/193 |

*Primary Examiner*—Donald L. Walton
*Attorney, Agent, or Firm*—Parkhurst, Wendel & Rossi

[57] ABSTRACT

A solid electrolyte tube for sodium sulfur cells, having an outer surface of a roughness defined by an arithmetical mean deviation of the profile ($R_a$) of not exceeding 2.0 $\mu$m and a maximum height of the profile ($R_{max}$) of not exceeding 15 $\mu$m, is produced by leveling the outer surface of the solid electrolyte tube in a state of green body, bisque fired and calcined body, or fired body, by means of a finishing apparatus such as a centerless grinding machine, external cylindrical grinding machine, lathe, or the like. The solid electrolyte tube having a smooth and even surface can be prevented from crack formation due to local concentration of Na ion, S, sodium polysulfide and thermal stress thereon, so that it can improve durability and reliability.

7 Claims, 3 Drawing Sheets

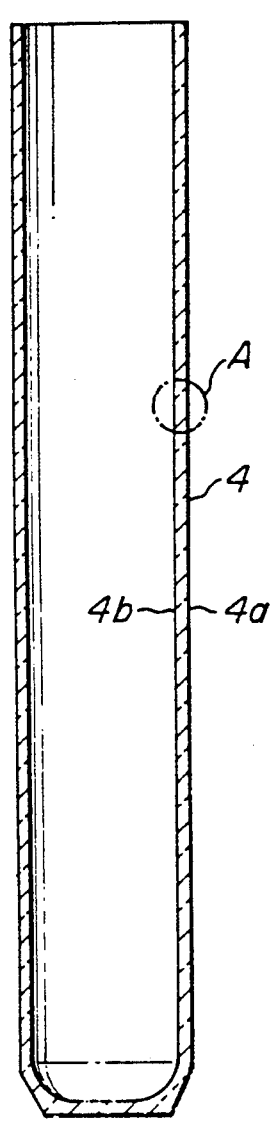
FIG_1
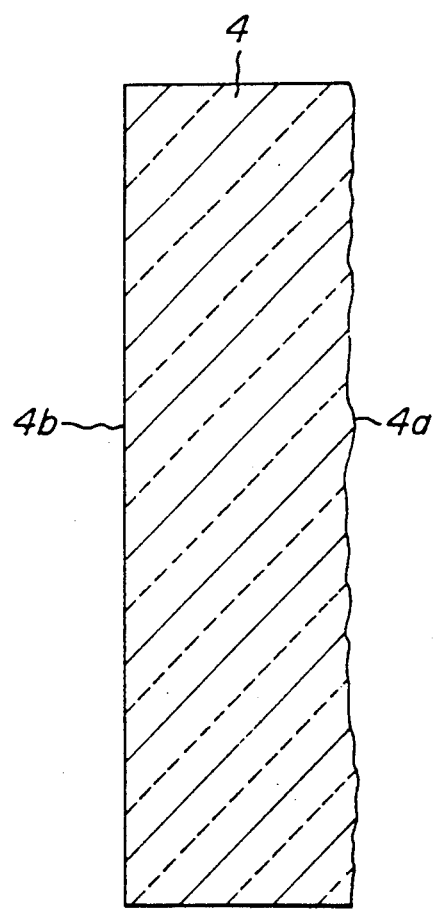
FIG_2

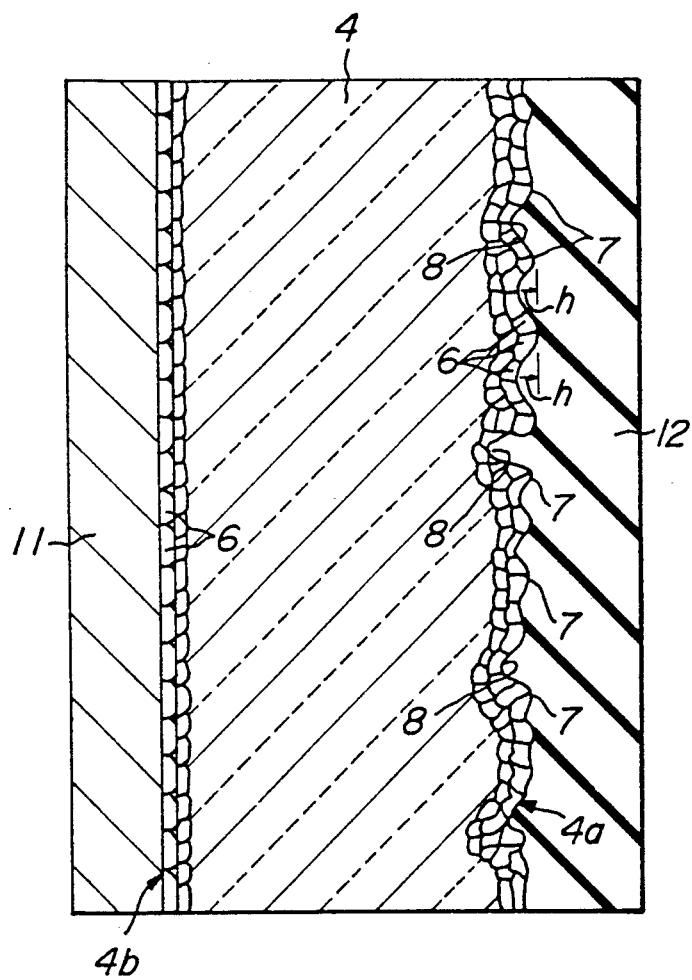
FIG_5
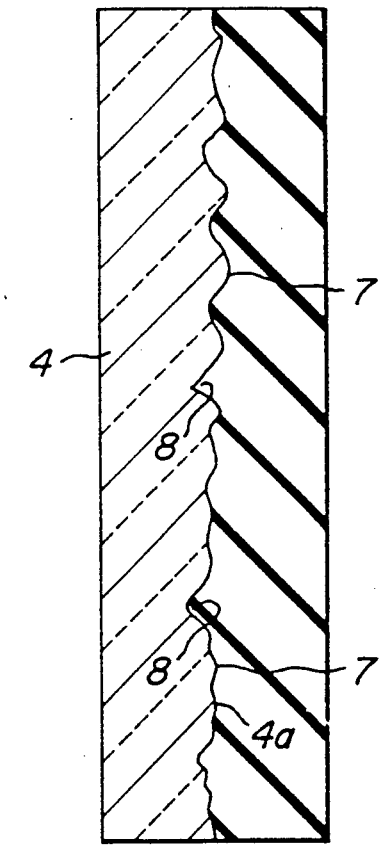
FIG_6

SOLID ELECTROLYTE TUBE FOR SODIUM SULFUR CELLS AND SURFACE FINISHING PROCESS THEREOF

BACKGROUND OF THE INVENTION

1. Field of the Invention

The present invention relates to a solid electrolyte tube for sodium sulfur cells and a process for finishing the surface thereof, particularly, to a solid electrolyte tube having improved durability and reliability and a surface finishing process for producing the same.

2. Description of the Prior Art

Recently, research and development have been conducted of high temperature type sodium sulfur cells which function at 300~350° C. and are excellent, from both functional and economical points of view, in application to electric vehicles or night electric power storage, as a secondary battery.

Hitherto known sodium sulfur cells, as shown in FIG. 3, comprise: a cylindrical anode container 1 accommodating an electroconductive material M for anode, such as carbon mat or the like, impregnated with molten sulfur S i.e. an anode active material; a cathode container 3 containing molten metallic sodium Na and being connected with the top end portion of the anode container 1 interposing an insulator ring 2 made of α-alumina therebetween; and a solid electrolyte tube 4 made of a polycrystalline $\beta''$-alumina in the form of cylindrical test tube shaped ceramic closed end tube extending downward from its open top end fixed on the inner peripheral portion of said insulator ring 2, which solid electrolyte tube functions to allow sodium ion $Na^+$, a cathode active material, to permeate selectively. Further, a long and slender cathode tube 5 extending through the cathode container 3 down to the bottom portion of the solid electrolyte tube 4 penetrates and is supported on the central portion of the upper lid of the cathode container 3.

During discharging, sodium ions permeate the solid electrolyte tube 4 and react with the sulfur S in the anode container 1 to form sodium polysulfide, according to the following reaction.

Alternatively, during charging, a reaction reverse to the above takes place to produce sodium, Na, and sulfur, S.

The solid electrolyte tube 4 of sodium sulfur cells composed as described above, since the material of the tube to be press-molded is a powder containing polycrystalline $\beta''$-alumina, is required to be molded by the so-called "rubber-press molding process", wherein the above powder containing polycrystalline $\beta''$-alumina is charged into the gap between an inner rigid mold 11 and an outer rubber mold 12, as shown in FIG. 4, constituting a rubber-press molding apparatus (an isostatic press) which are then introduced into a high pressure vessel to isostatically press the external peripheral surface of the outer rubber mold 12 at a predetermined pressure P. Thus the pressure acts evenly on and over the whole body of the solid electrolyte tube 4 so that it makes the density uniform throughout the molded body.

The solid electrolyte tube 4 obtained by the above described rubber-press molding process, since the inner surface 4b is high-pressure molded with the rigid inner mold 11, has a rather smooth and even inner surface 4b densified with compressed power particles 6 as shown in the left hand side of FIG. 5. Therefore, during electric discharge, sodium ions uniformly permeate the solid electrolyte tube 4 so that the inner surface 4b presents little problem. However, the outer surface 4a of the solid electrolyte tube 4 is molded with the non-rigid rubber mold 12, so that its surface condition is not always smooth and even, as shown on the right hand side of FIG. 5. With respect to the surface roughness, the outer surface 4a shows a very high arithmetical mean deviation of the profile $R_a$ as well as a large maximum height of the profile $R_{max}$, as compared with the inner surface 4b. Consequently, in the use condition of the solid electrolyte tube 4, sodium ion $Na^+$, sulfur S and sodium polysulfide $Na_2S_x$ which contact with the surface of the solid electrolyte tube are apt to gather in valley portions 8 rather than on peak portions 7, as shown in FIG. 6. Therefore, electric current concentrates on the valley portions 8 so that the valley portions 8 become liable to deteriorate. Alternatively, when the sodium sulfur cells are heated or chilled, thermal stresses are apt to concentrate at the valley portions 8. Therefore, cracks are liable to initiate at the valley portions 8, so that problems are presented such that the life of the solid electrolyte tube 4 is shortened and the reliability thereof as a battery is lowered.

SUMMARY OF THE INVENTION

A first object of the present invention is to provide solid electrolyte tubes which can improve sodium sulfur cells in durability and reliability.

A second object of the present invention is to provide a surface finishing process of solid electrolyte tubes, which readily effects leveling of the surface.

Further, a third object of the present invention in addition to the second object is to provide a surface finishing process of solid electrolyte tubes, which can improve the surface roughness thereof.

Furthermore, a fourth object of the present invention is to provide a surface finishing process of solid electrolyte tubes, which allows the solid electrolyte tubes to be formed in any desired dimension and to have a further leveled, smooth and even surface.

The above first object can be achieved by a solid electrolyte tube for sodium sulfur cells, which has a surface roughness defined by an arithmetical mean deviation of the profile $R_a$ of not exceeding 2.0 μm and a maximum height of the profile $R_{max}$ not exceeding 15 μm.

Through the specification and appended claims of this invention, the arithmetical mean deviation of the profile $R_a$ and the maximum height of the profile $R_{max}$ are understood to be as defined in accordance with ISO R 468 (Definitions and Designation of Surface Roughness).

The above second object can be achieved by the first embodiment of the surface finishing process of solid electrolyte tubes according to the present invention, wherein the outer surface of the solid electrolyte tube in a state of as-molded unfired and non-bisque fired green, is leveled by means of a finishing apparatus.

The above third object can be achieved by the second embodiment of the surface finishing process of solid electrolyte tubes according to the present invention, wherein the outer surface of the solid electrolyte tube in a state of bisque fired and calcined, molded body, is leveled by means of a finishing apparatus.

The above fourth object can be achieved by the third embodiment of the surface finishing process of solid electrolyte tubes according to the present invention, wherein the outer surface of the solid electrolyte tube in a state of bisque fired and fired, molded body, is leveled by means of a finishing apparatus.

BRIEF DESCRIPTION OF THE DRAWINGS

The present invention will be explained in more detail hereinafter by way of example with reference to the appended drawings.

FIG. 1 is a sectional elevation along the longitudinal axis of a solid electrolyte tube of the present invention;

FIG. 2 is an enlarged view of the part A of FIG. 1;

FIG. 5 is an enlarged view of the part B of FIG. 4; and

FIG. 6 is an enlarged sectional elevation of a part of surfaces of a solid electrolyte tube.

DESCRIPTION OF THE PREFERRED EMBODIMENTS

Figure 3:
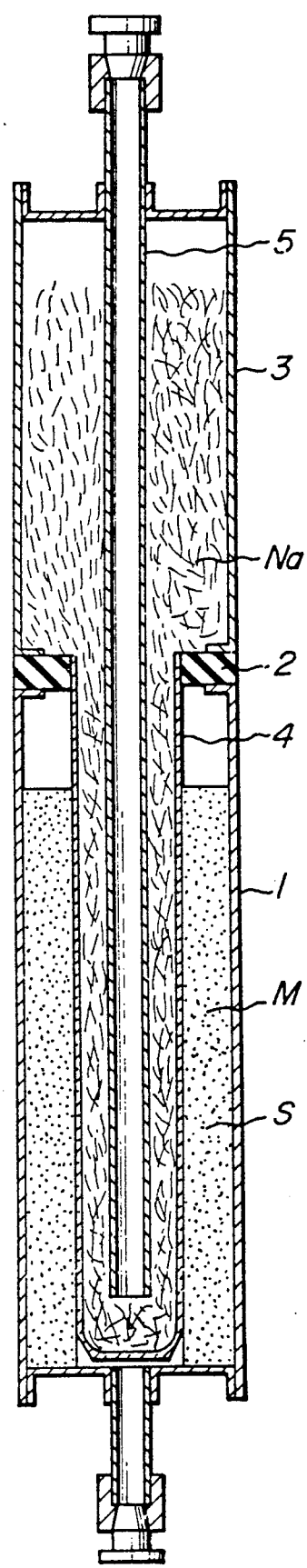
FIG. 3 is a sectional elevation along the longitudinal axis of a sodium sulfur cell.
Figure 4:
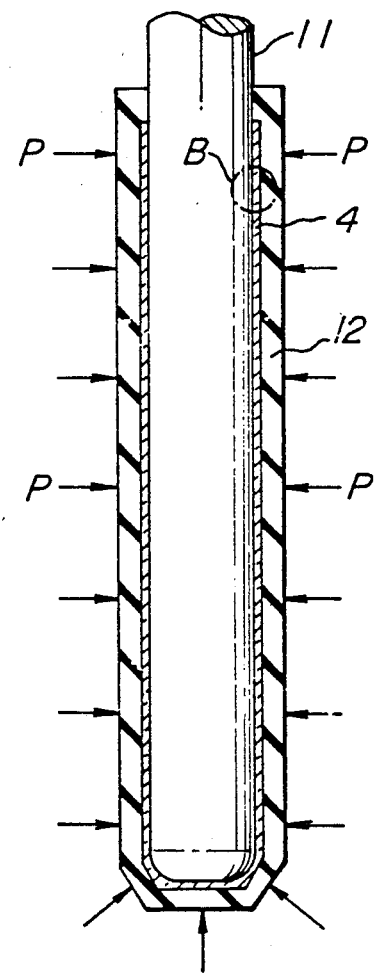
FIG. 4 is a sectional elevation for illustrating a molding process of a solid electrolyte tube.

In the case where the solid electrolyte tube of the present invention is used in sodium sulfur cells, sodium ion, sulfur or sodium polysulfide contacting with the surface of the solid electrolyte tube does not concentrate locally on the surface of the solid electrolyte tube by virtue of its low surface roughness. Additionally, when the sodium sulfur cells are heated and chilled, the concentration of the thermal stress on the surface of the solid electrolyte tube is relaxed, so that the solid electrolyte tube is restrained from deterioration.

Alternatively, the above first embodiment of the surface finishing process of solid electrolyte tubes according to the present invention has an outstanding merit of facilitating the surface leveling, as the solid electrolyte tubes in a state of unfired, green molded body have a soft surface as compared with fired bodies.

The above second embodiment of the surface finishing process of solid electrolyte tubes according to the present invention facilitates the surface leveling to decrease the surface roughness after molding, as the surface of the bisque fired and calcined solid electrolyte tube can be leveled under the condition close to the unfired, green molded bodies.

The above third embodiment of the surface finishing process of solid electrolyte tubes according to the present invention, since the surface of the fired solid electrolyte tube is leveled, has an outstanding merit such that the surface roughness can be made to be further lowered, to an equal level of the polished roughness, and the solid electrolyte tube can be formed in a final desired dimension.

The invention will be explained in more detail hereinafter by way of example.

EXAMPLE 1

This example illustrates the first embodiment of the surface finishing process of solid electrolyte tubes for sodium sulfur cells according to the present invention.

On the outset, α-alumina, sodium carbonate and lithium oxalate compounded in a predetermined formulation are pulverized and mixed by means of wet grinding, for example with a 100 λ ball-mill.

Thereafter, the resulting mixture is granulated, preferably by a spray dryer, into a powder having a predetermined particle diameter (an average particle diameter of 40~120 μm).

Then, using a rubber-press apparatus (an isostatic press), a solid electrolyte tube 4 in the form of cul-de-sac as shown in FIG. 1, for example, having an outside diameter of 15 mm, a wall thickness of 1.0 mm and a length of 150 mm, is molded at a pressure of 2.5 ton/cm².

Further, using a centerless grinding machine, the above molded solid electrolyte tube 4 in a state of unfired and non-bisque fired green is ground-finished at its surface 4a with a diamond grinding wheel (#180).

Then, finishing the surface by a paper wiper or nylon mesh, the leveling of the outer surface of the solid electrolyte tube is completed. Finally, after bisque firing at about 1,000° C. for 2 hours and firing at about 1,600° C. for 10 minutes, a solid electrolyte tube made of β"-alumina that is most suitable for sodium sulfur cells is obtained.

The thus produced solid electrolyte tube 4 has a smooth and even surface 4a as shown in FIG. 2. The surface 4a has an arithmetical mean deviation of the profile $R_a$ of 0.5~0.8 μm and a maximum height of the profile $R_{max}$ of 6~11 μm, as shown in Table hereinbelow.

Further, the solid electrolyte tube 4 so molded by the above rubber-press as to have an inner peripheral surface of a center-line mean roughness $R_a$ of at most 0.5 μm and a maximum height $R_{max}$ of at most 5.0 μm, is particularly desirable for securing the smooth movement of the cathode active materials from inside to outside of the solid electrolyte tube 4.

EXAMPLE 2

The solid electrolyte tube 4 in a state of unfired and non-bisque fired green mold, manufactured in the foregoing Example 1, is bisque fired at about 1,000° C. for 2 hours. Using a centerless grinding machine, the bisque fired and calcined solid electrolyte tube 4 is finished in dry at its surface with a diamond grinding wheel (#180).

Finally, firing at about 1,610° C. for 5 minutes, a solid electrolyte tube 4 is obtained. The surface of this solid electrolyte tube 4 has an arithmetical mean deviation of the profile $R_a$ of 0.2~0.4 μm as shown in Table hereinbelow, which is much better than the arithmetical mean deviation of the profile $R_a$ of the solid electrolyte tube obtained in Example 1. Additionally, the maximum height of the profile $R_{max}$ is 2~6 μm which is smoother than the solid electrolyte tube 4 of Example 1.

EXAMPLE 3

The solid electrolyte tube 4 in a state of unfired and non-bisque fired green mold, manufactured in the foregoing Example 1, is fired at about 1,590° C. for 15 minutes. Thereafter, using a centerless grinding machine, the solid electrolyte tube 4 in a sintered state is finished in wet at its surface 4a with a diamond grinding wheel (#180) and further finished in wet with a #1,200 diamond grinding wheel.

The surface of this solid electrolyte tube 4 has an arithmetical mean deviation of the profile $R_a$ of 0.2~0.4 μm, which is as good as the arithmetical mean deviation of the profile $R_a$ of the solid electrolyte tube obtained in Example 2. Additionally, the maximum height of the profile $R_{max}$ is also 2~6 μm same as the solid electrolyte tube 4 of Example 2.

Note)

Using solid electrolyte tubes 150 mm long, having an outside diameter of 15 mm and a wall thickness of 1.0 mm, prepared by molding and finishing processes shown in Examples 1~3, 10 each of sodium sulfur cells having a cell capacity of 60 Wh were manufactured which comprise an anode active material of graphite impregnated with sulfur and a cathode active material of molten sodium. A charge-discharge durability test was conducted by applying an electricity of 80 mA/cm$^2$ current density at an operating temperature of 330° C. for totalling 40 cells including 10 cells wherein a conventional solid electrolyte tube was used.

TABLE 1

| Example | $R_a$ (μm) | $R_{max}$ (μm) | Durablity (Cumulative breakage) | | | |
|---|---|---|---|---|---|---|
| | | | 500 cycles | 1,000 cycles | 1,500 cycles | 2,000 cycles |
| Conventional | 2.7~4.2 | 23~35 | 7/10 (70%) | 10/10 (100%) | — | — |
| 1 | 0.5~0.8 | 6~11 | 0/10 | 1/10 (10%) | 4/10 (40%) | 6/10 (60%) |
| 2 | 0.2~0.4 | 2~6 | 0/10 | 0/10 | 1/10 (10%) | 3/10 (30%) |
| 3 | 0.2~0.4 | 2~6 | 0/10 | 0/10 | 2/10 (20%) | 4/10 (40%) |

The breakage rates of the cells after passing every 500 cycles are shown in Table 1.

It is clear from Table 1 that the sodium sulfur cells wherein the solid electrolyte tube according to the present invention is used is remarkably improved in durability as compared with the cells wherein the conventional solid electrolyte tube is used.

Further, the present invention can be embodied as follows.

Although a centerless grinding machine equipped with a diamond grinding wheel was used as a finishing apparatus in the foregoing Examples, it is needless to say that, in this case, the surface roughness can be varied by changing the grit or grain size of the diamond grinding wheel. Namely, in the foregoing each Example, the arithmetical mean deviation of the profile can be further lowered by further decreasing the abrasive grain size of the diamond grinding wheel. Further, the present invention may be practiced or embodied in still other ways without departing from the spirit or essential character thereof. For example, the centerless grinding machine can be replaced by other devices such as a lathe, an external cylindrical grinding machine or the like, or the finishing may be performed by using abrasive grains.

The solid electrolyte tube of the present invention, since its surface has a low arithmetical mean deviation of the profile, has meritorious effects such that the surface strength is improved and, besides, when it is used in sodium sulfur cells, local concentration of sodium ion, sulfur or sodium polysulfide as well as thermal stresses on the surface of the solid electrolyte tube is prevented, so that the solid electrolyte tube can be improved in durability.

Alternatively, the above surface finishing process of solid electrolyte tubes according to the present invention can readily level the surface of the solid electrolyte tubes in a state of unfired, green molded body and further can perform the surface leveling of the solid electrolyte tubes in a bisque fired and calcined state, as effectively as in the case of green mold, so that the surface roughness after firing can be further lowered. Moreover, when the surface of the solid electrolyte tubes of sintered body is leveled, the arithmetical mean deviation of the profile of the surface can be similarly decreased and the dimension of the solid electrolyte tubes can be accorded precisely with the desired dimension of the final products, yielding solid electrolyte tubes high in dimensional accuracy.

What is claimed is:

1. A surface finishing process for a solid electrolyte tube, comprising the steps of:
    (a) compression molding a green body in the shape of said tube;
    (b) bisque firing and calcining said green body to form an intermediate body in the shape of said tube;
    (c) firing said intermediate body to form a fired body; and
    mechanically finishing an outer surface of the body after any of steps (a) or (b) to such an extent that an outer surface of said fired body has a roughness value X;
    wherein said roughness value X is defined by an arithmetical means deviation of the profile ($R_a$) of not greater than 2.0 microns and a maximum height of the profile ($R_{max}$) of not greater than 15 microns.

2. The process of claim 1, wherein the outer surface of the body is mechanically finished after step (a).

3. The process of claim 1, wherein the outer surface of the body is mechanically finished after step (b).

4. The process of claim 1, wherein the outer surface of the body is mechanically finished after steps (a) and (b).

5. The process of claim 1, wherein the outer surface of the body is mechanically finished after steps (b) and (c).

6. The process of claim 1, wherein the outer surface of the body is mechanically finished after steps (a), (b) and (c).

7. The process of claim 1, wherein said outer surface of the body after step (a) or step (b) is ground to a depth of at least said maximum height of the profile ($R_{max}$) of the green body or the intermediate body before mechanical finishing.

* * * * *